Feb. 28, 1933.    A. S. WHEELBARGER ET AL    1,899,250
FULL STROKE MECHANISM
Original Filed Oct. 29, 1925
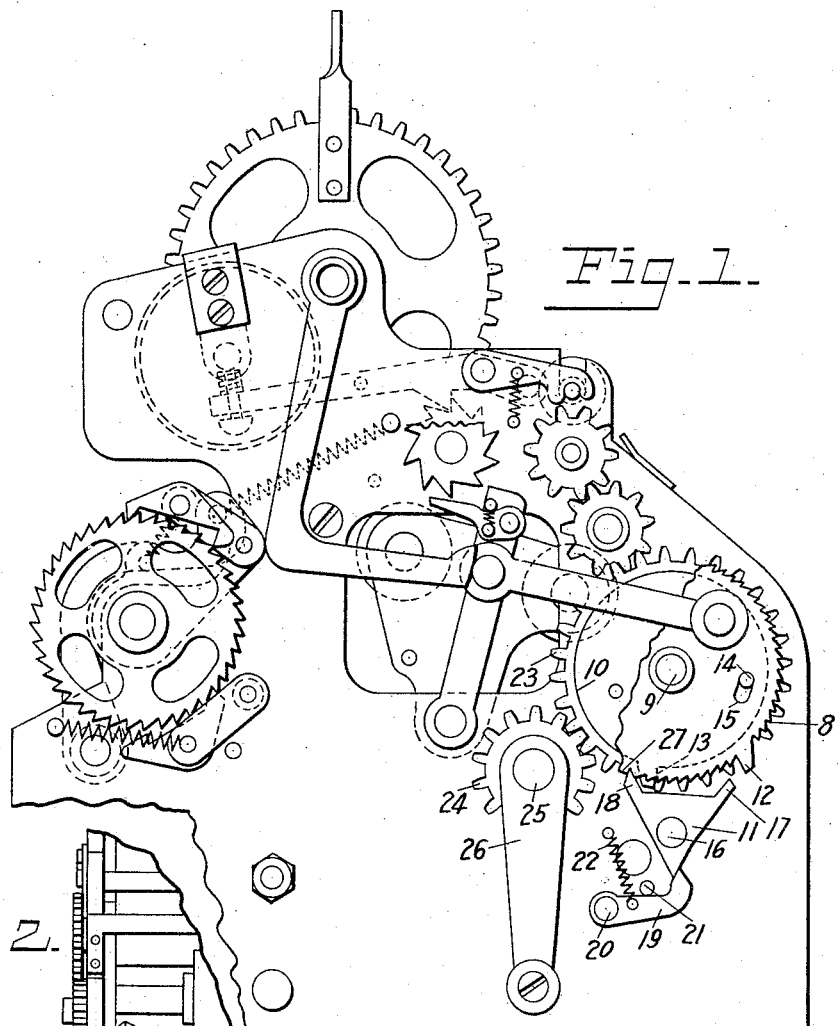
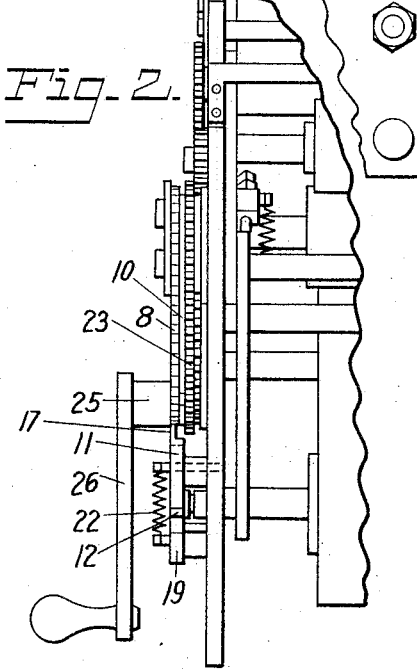
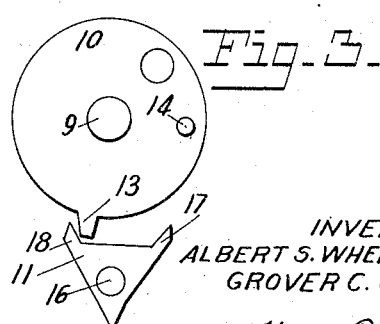
INVENTORS.
ALBERT S. WHEELBARGER.
GROVER C. COIL.
H.W.Baker
ATTORNEY.

Patented Feb. 28, 1933

1,899,250

UNITED STATES PATENT OFFICE

ALBERT S. WHEELBARGER AND GROVER C. COIL, OF DAYTON, OHIO, ASSIGNORS TO OHMER FARE REGISTER COMPANY, OF DAYTON, OHIO

FULL STROKE MECHANISM

Original application filed October 29, 1925, Serial No. 65,532. Divided and this application filed September 26, 1929. Serial No. 395,330.

This invention relates to a full stroke mechanism and is a division of the application of Albert S. Wheelbarger and Grover C. Coil, Serial Number 65,532, filed October 29, 1925. The object of the invention is to provide means whereby the conductor is compelled to issue a ticket and to prevent the operator from rotating the crank handle for a portion of a rotation and then rotating it backwardly to its original position. Another object of the invention is to provide means to positively stop the rotation of the crank handle after it has completed its operation. Another object of the invention is to provide means whereby it is necessary to rotate the crank handle rearwardly for a short distance in order to unlock the mechanism so that the crank handle can be rotated in its normal direction to operate the machine.

Referring to the drawing—

Fig. 1 is an elevational view of the left side of the machine.

Fig. 2 is a fragmentary portion of the front of the machine, and

Fig. 3 is a detailed view of the locking dog and the operating mechanism therefor.

All of these views are shown with the casing of the machine removed.

The rachet 8 is rigidly mounted on the shaft 9. On the same shaft is mounted a disk 10. The ratchet 8 is provided with ratchet teeth for the major portion of its circumference and is also provided with a large tooth 12. The disk 10 is provided with a single tooth 13. The disk 10 is rotatably mounted on the shaft 9 and is operatively connected with the ratchet 8 by means of a pin 14 on the disk 10, which pin extends through a slot 15 in the ratchet 8. The dog 11 is pivoted on a pin 16 and is provided with a nose 17 actuated by the tooth 12 and a nose 18 actuated by the tooth 13. The dog 11 is V-shaped and is held in either of its two positions by means of a lever 19 pivoted on a pin 20 in one of the sidewalls of the machine. A stop pin 21 projects from the side of the casing immediately above the lever 19. The lever 19 is normally urged toward the stop pin 21 by means of a spring 22. Secured to the disk 10 is a gear 23 which gear is rotatably mounted on the shaft 9 and is in mesh with a pinion 24 secured to a shaft 25, which shaft also receives a crank handle 26. The pinion 24 is one-half the size of the gear 23 so that the crank handle 26 must be rotated twice in order to rotate the gear 23 and shaft 9 one complete revolution. After the shaft 9 has been completely rotated the dog 11 is in the position shown in Fig. 1 with the nose 18 engaging a tooth 27 on the ratchet 8.

The crank handle 26 is normally rotated in a clockwise direction, but when the parts are in the position shown in Fig. 1 the crank handle 26 cannot be rotated in a clockwise direction for if it were the gear 23 would be rotated in an anti-clockwise direction, which action is prevented by the nose 18 engaging the tooth 27. The crank handle 26 must therefore be rotated slightly in an anti-clockwise direction so that the tooth 13 will engage the nose 18 rocking the dog 11 in an anti-clockwise direction. The lower end of the dog 11 moves the lever 19 downwardly until the end of the lever 19 passes the lower extremity of the dog 11 whereupon the spring 22 pulls the lever 19 upwardly holding the nose 17 and the dog 11 against the teeth of the ratchet 8. The ratchet can now be rotated in a clockwise direction by means of the pin 14 engaging the end of the slot 15. At the end of the complete rotation the tooth 12 engages a nose 17 of the dog 11 and rocks the dog into the position shown in Fig. 1. As the dog 11 was being thus rocked the lever 19 was depressed until the upper end thereof passed the lower extremity of the dog 11 and the spring 22 then pulled the lever 19 upwardly holding the dog 11 in that position.

The object of the pin and slot connection is to permit of the slight anti-clockwise rotation of the crank handle 26, without rotating the shaft 9. This construction prevents the operator from accidentally rotating the crank handle 26 for two movements are necessary in order to actuate the shaft 9; first, a slight anti-clockwise rotation of the crank handle 26 and then two complete revolutions thereof.

It is obvious that many changes may be made in the construction of the various parts shown and described in this application without departing from the spirit of the claims. We, therefore, expressly reserve the right to make all changes in construction or operation of the machine which would fall within the scope of the appended claims.

Having described the invention in its preferred embodiment, we claim:

1. In a machine of the class described, a full stroke mechanism including a shaft, a ratchet secured thereto provided with an enlarged tooth, an actuating gear, a disk secured thereto and provided with an enlarged tooth, a lost motion connection between said disk and said ratchet, and means whereby said ratchet is locked or unlocked, said means being controlled by said enlarged teeth.

2. In a machine of the class described, a full stroke mechanism including a shaft, a ratchet and a disk, one of which is rotatably mounted and the other of which is fixed on said shaft, a lost motion connection between said disk and ratchet, a double nosed dog, means carried by said ratchet to trip said dog so as to lock said ratchet when the ratchet has completed a revolution, and means carried by the disk to trip said dog so as to unlock said ratchet when the disk is moved slightly in the reverse direction from its normal rotation.

3. In a machine of the class described, a shaft, means whereby said shaft is rotated, means whereby said shaft is locked against reverse rotation, means whereby said shaft is locked against further movement after it has made a complete revolution, and means whereby said shaft may be unlocked so that it may be operated normally, said three last mentioned means including a double nosed dog.

4. In a machine of the class described, a shaft, means whereby said shaft is rotated, means whereby said shaft is locked against reverse rotation, means whereby said shaft is locked against further movement after it has made a complete revolution and means whereby said shaft may be unlocked so that it may be operated normally, said three last mentioned means including a double nosed dog and means whereby said dog is held in either of two positions.

5. In a machine of the class described, a full stroke mechanism, including a shaft, a ratchet secured thereto, an actuating gear, a disk secured to said gear, a lost motion connection between said disk and said ratchet and means whereby said ratchet is locked or unlocked and means carried by said ratchet and disk to control the locking and unlocking means for said ratchet.

6. In a machine of the class described, a full stroke mechanism including a shaft, a ratchet secured thereto, an enlarged tooth forming a part of said ratchet, a disk loosely mounted on said shaft, an enlarged tooth forming a part of said disk, a lost motion connection between said disk and ratchet, and means controlled by said enlarged teeth to lock or unlock said ratchet.

7. In a full stroke mechanism, a shaft, a ratchet secured thereto, a disk rotatably mounted on said shaft, an enlarged tooth on said ratchet, an enlarged tooth on said disk, and means controlled by said enlarged teeth to lock or unlock said ratchet.

8. In a full stroke mechanism, a shaft, a ratchet secured thereto, a disk rotatably mounted on said shaft, an enlarged tooth on said ratchet, an enlarged tooth on said disk, and a double nosed dog controlled by said enlarged teeth to lock or unlock said ratchet.

9. In a full stroke mechanism, a shaft, a ratchet secured thereto, a disk rotatably mounted on said shaft, an enlarged tooth on said ratchet, an enlarged tooth on said disk, and a pivoted double nosed dog adapted to be shifted on its pivot by said enlarged teeth to lock or unlock said ratchet.

10. In a full stroke mechanism, a shaft, a ratchet secured thereto, a disk rotatably mounted on said shaft, an enlarged tooth on said ratchet, an enlarged tooth on said disk, actuating means to rotate said shaft in one direction, and a pivoted double nosed dog, one of the noses of which engages said ratchet when in normal position so as to prevent said shaft from being rotated by the actuating means, said nose on said disk engaging the last mentioned nose of the dog and rotating the dog on its pivot when the said actuating means is given a slight rotation in a direction opposite to its movement to actuate the shaft so as to disengage the dog from said ratchet.

11. In a full stroke mechanism, a shaft, a ratchet secured thereto, a disk rotatably mounted on said shaft, an enlarged tooth on said ratchet, an enlarged tooth on said disk, actuating means to rotate said shaft in one direction, and a pivoted double nosed dog, one of the noses of which engages said ratchet when in normal position so as to prevent said shaft from being rotated by the actuating means, said nose on said disk engaging the last mentioned nose of the dog and rotating the dog on its pivot when the said actuating means is given a slight rotation in a direction opposite to its movement to actuate the shaft so as to disengage the dog from said ratchet the enlarged tooth on said ratchet engaging the other of the noses of said dog and shifting the dog so as to bring the first of said noses into locking engagement with said ratchet when the shaft has completed one rotation.

12. In a full stroke mechanism, a shaft, actuating means therefor, locking means normally locking said shaft against any rotation, means whereby said locking means is released so as to permit said shaft to be rotated, means to prevent retrograde movement of said shaft after its rotation has commenced, and means to bring said locking means into operation as soon as said shaft has completed its one revolution.

In testimony whereof we affix our signatures.

ALBERT S. WHEELBARGER.
GROVER C. COIL.